Nov. 6, 1951     P. J. FALSON     2,574,382
CONDUIT BOX COVER
Filed Jan. 10, 1948
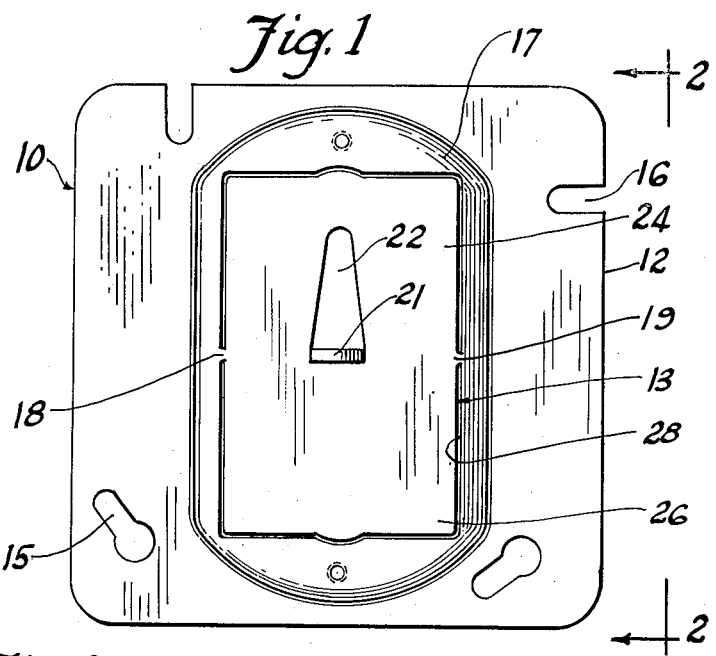
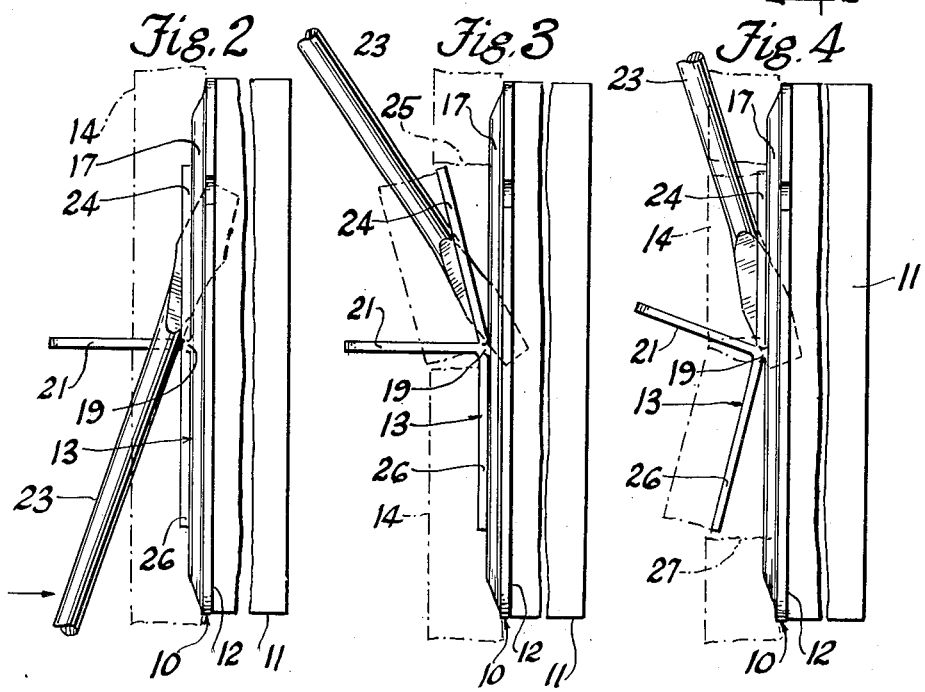
INVENTOR.
Phillip J. Falson
By Thiess, Olson & Mecklenburger
Attorneys Patented Nov. 6, 1951

2,574,382

UNITED STATES PATENT OFFICE 2,574,382

CONDUIT BOX COVER

Phillip J. Falson, Chicago, Ill.

Application January 10, 1948, Serial No. 1,517

2 Claims. (Cl. 220—3.8)

This application relates to covers for conduit boxes having a plate associated therewith which is removable to provide a space for receiving switch mechanism, for example, and when assembled to a conduit box and placed in position on building walls or floors, for example during building construction, can be covered with plaster or other covering without regard to contaminating the interior of the conduit box and thereafter can be easily located, more particularly it relates to such conduit box covers wherein the removable plate is easily removed after plastering thereover without contaminating the interior of the conduit box, and it is an object of the invention to provide an improved conduit box cover of this character.

During the construction of buildings, conduits are placed in position, electrical conductors are received therethrough, and conduit boxes are placed at the ends of the conduits to receive electrical switches, plug-in outlets or the like. The conduits are placed within the wall to prevent their being visible normally, and consequently are so placed before the wall surfacing is put on. If plaster is being used to surface the wall, the plasterer may cover over the top of the conduit box in prior structures, in which event it becomes concealed and difficult to find by the electrician when he desires to mount switches, plug-in outlets, etc. Even when the conduit box is found after plaster has been placed thereover, the plaster which oozed over the edges of the conduit box must be broken away. In so doing, the surrounding edges may be marred and may require some patching before the electrical fixtures can be installed. Moreover, plaster squeezed therein tends to contaminate the conduit box and the associated conduits and thus necessitates cleaning thereof so that electrical fixtures may be installed and deterioration prevented.

Alternatively, the plasterer or individual applying whatever wall covering is being applied may exercise exacting caution to prevent the plaster from flowing into the conduit boxes thereby obviating previously outlined disadvantages. Such procedure is time consuming and consequently expensive.

It has heretofore been suggested that conduit box covers be provided with knockout plates which may be provided with indicators so that the conduit box may be located when covered with plaster; and by the judicious application of pounding, for example with a hammer, the knockout plate may be removed together with the attached plaster. Such articles are subject to the disadvantage that in knocking out the removable plate the edges of the plaster may be marred, requiring patching operations.

Accordingly, it is a further object of the invention to provide an improved conduit box cover of the character indicated wherein the removable plate associated with the conduit box cover may be easily located and removed without substantially marring the surrounding plaster or other wall covering.

In carrying out the invention in one form, a cover plate for a conduit box is provided comprising a base plate having an opening therein, a secondary plate overlying the opening and attached to the base plate by rupturable slugs of metal, and a tongue punched from the secondary plate and deformed to project outwardly therefrom.

For a more complete understanding of the invention reference should be had to the accompanyng drawings in which:

Figure 1 is a plan view of a conduit box cover plate embodying the invention;

Fig. 2 is a side view taken substantially in the direction of the arrows 2—2 of Fig. 1;

Fig. 3 is a view similar to Fig. 2 depicting a subsequent phase in the use of the cover plate, and Fig. 4 is a view similar to Fig. 3 showing a still subsequent phase in the use of the cover plate.

Referring to the drawings, the invention is shown as comprising a cover plate 10 associated with a conduit box 11, the cover plate including a base plate 12 and a removable or secondary plate 13. In Figs. 2, 3 and 4 a layer of plaster 14 (dot-dash line) is shown applied over the top of the cover plate as would be the case during building construction.

Base plate 12 may be of any desired shape and is provided with suitable holes 15 and slots 16 in its periphery by means of which it may be attached to the conduit box through the use of screws. The base plate may be made of suitable metal or other material of a thickness suitable for the particular purposes.

As shown, base plate 12 includes an embossment 17 throughout its central area extending upwardly a slight amount from the overall plane. Removable plate 13 may be of any desired shape which corresponds to the contour of the switch or outlet to be attached to the cover plate. Plate 13 may be sheared or punched from base plate 12 so that the metal of plate 13 is free of the base plate metal at all points around the periphery thereof except at a pair of points designated 18 and 19 forming an upper part 24 and a lower part 26. In order that no substantial friction exists between sheared-out parts 24 and 26 and the adjacent edges of the hole in base plate 12, the secondary plate is pushed completely away from the upper surface of embossment 17, as may be seen best in Figs. 2, 3 and 4. In Fig. 1, for purposes of clarity, the space 28 between the edge of plate 13 and the edge of the hole in embossment 17 is shown somewhat larger than would actually be the case, it being only necessary that the metal of the secondary plate be sheared completely free of the metal of the cover plate except for the two attaching slugs of metal 18 and 19.

Punched from secondary plate 13, substantially centrally thereof, is a tongue 21, the punching process leaving an opening 22. Tongue 21 is bent outwardly, preferably at right angles to the surface of the cover plate, as may be seen best in Figs. 2, 3 and 4. The shearing operation severing secondary plate 13 from the base plate is such that slugs of metal 18 and 19 are spaced substantially opposite each other on the two sides of the secondary plate and substantially in line with the protruding tongue 21 or the base of hole 22. It is not necessary that slugs 18 and 19 and the base of tongue 21 be directly in line, but in the preferred construction these members lie substantially in a line. Moreover, slugs of metal 18 and 19 are relatively small so that the secondary plate 13 is held to the main plate only by sufficient material to assure that the secondary plate will not be displaced during the plastering operation or during other constructing, shearing, or handling operations. Preferably slugs 18 and 19 are substantially centrally positioned between the ends of the removable plate.

Referring more particularly to Figs. 2, 3 and 4, the functioning of the improved cover plate may be understood. In Fig. 2 wherein a layer of plaster 14 is assumed applied over the top of the cover plate, it will be seen that the end of tongue 21 projects outwardly from the surface of the plaster. By virtue of this, an electrician or any other person so desiring can locate conduit boxes merely by noting the location of projecting tongues. A plasterer applying plaster over the top of the conduit box cover need pay no attention thereto except to avoid hitting the projecting tongue. Any small amount of plaster which may ooze through hole 22 is not sufficient to contaminate the inside of the conduit box and is therefore negligible. The slot 28 between the secondary plate and the edges of the hole in embossment 17 is so small that no plaster is forced therethrough.

When an electrician is ready to assemble the outlets or switches to the conduit boxes, he proceeds immediately to the area where a tongue 21 is exposed and inserts a screw driver or other pry 23 through the layer of plaster 14 and into hole 22, as shown. Then by pushing the pry further in the direction of the arrow, Fig. 2 (using the inner end of hole 22 as a fulcrum), the part 24 of secondary plate 13 lying above slugs of metal 18 and 19 is bent outwardly to the position shown in Fig. 3. In so bending portion 24 outwardly the plaster is broken clean along the surface shown by the dot-dash line 25. The edges of part 24 apply a localized stress to the layer of plaster thereby assuring a clean break without any substantial amount of crumbling. With the secondary plate in the position shown in Fig. 3, the pry 23 is shifted to the position shown in this figure (the inner end of hole 22 forms a fulcrum) and part 24 is then forced downwardly pivoting about slugs of metal 18 and 19 until this part assumes a vertical position, as shown in Fig. 4. This movement causes the lower part 26 of secondary plate 13 to be tilted outwardly, as shown, thereby removing the layer of plaster along a surface shown as dot-dash line 27. The edges of part 26 also apply a highly localized stress to the layer of plaster 14 and thereby provide a clean break with no crumbling. If the two movements described have not been sufficient to rupture the slugs of metal 18 and 19, the pry 23 may be reversed similarly to the position shown in Fig. 2 and secondary plate 13 pivoted so that part 26 lies vertically and part 24 extends angularly outward. This process may be repeated several times until slugs of metal 18 and 19 rupture. Thereupon, secondary plate 13, together with the attached plaster, may be removed by grasping tongue 21 and lifting it away from the cover plate.

The thickness of the cover plate metal may be chosen, together with the width of metal slugs 18 and 19, so that a very small number of bending operations will produce rupturing of slugs 18 and 19. While slugs 18 and 19 have been shown as metal left in position after secondary plate 13 has been sheared from the main plate, it will be understood that other constructions may be followed without departing from the spirit and scope of the invention. For example, secondary plate 13 may be completely sheared from the base plate 12 and held in position by small amounts of weld corresponding to slugs 18 and 19, or small shear pins may be impressed into position.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described the invention, what is claimed and desired to be secured by Letters Patent is:

1. A conduit box cover plate adapted to be disposed in a wall and behind a frangible wall covering surface for serving in part to produce a clean hole in the wall covering surface without any substantial marring of the surrounding wall covering surface comprising, a base plate, a secondary plate completely sheared from said base plate except at a pair of diametrically opposite slugs and displaced from said base plate a distance substantially equal to the thickness of said plates whereby no substantial friction exists between said plates, said slugs being narrow such that they may be ruptured by a to-and-fro movement of said secondary plate which also serves to break such frangible wall surface to form such clean hole, an unobstructed aperture in said secondary plate for the insertion of a pry to effect said movement, and a locator punched from said secondary plate and projected sufficiently outward therefrom to extend beyond said wall covering surface.

2. A conduit box cover plate adapted to be disposed in a wall and behind a frangible wall covering surface for serving in part to produce a clean hole in the wall covering surface without any substantial marring of the surrounding wall covering surface comprising, a base plate, a secondary plate completely sheared from said base plate except at a pair of diametrically opposite slugs and displaced from said base plate a distance substantially equal to the thickness of said plates whereby no substantial friction exists between said plates, said slugs being narrow such that they may be ruptured by a to-and-fro movement of said secondary plate which also serves to break such frangible wall surface to form such clean hole, and a locator punched from said secondary plate and projected outwardly therefrom to provide an unobstructed aperture for the insertion of a pry.

PHILLIP J. FALSON.

REFERENCES CITED

The following references are of record in the file of this patent:

UNITED STATES PATENTS

| Number | Name | Date |
|---|---|---|
| 1,758,126 | Peterson | May 13, 1930 |
| 1,935,565 | Goetzelman | Nov. 14, 1933 |
| 1,944,707 | Clayton | Jan. 23, 1934 |
| 1,962,317 | Mangin | June 12, 1934 |
| 2,000,851 | Knell | May 7, 1935 |
| 2,157,646 | Barker | May 9, 1939 |
| 2,240,187 | Kingdon et al. | Apr. 29, 1941 |